United States Patent [19]

Chedville

[11] Patent Number: 5,575,848

[45] Date of Patent: Nov. 19, 1996

[54] APPARATUS FOR APPLYING COATINGS TO FOOD

[76] Inventor: Darryl J. Chedville, 308 E. Weber St., Gonzales, La. 70737

[21] Appl. No.: 350,896

[22] Filed: Dec. 7, 1994

[51] Int. Cl.$^6$ ............................................. A23G 3/00
[52] U.S. Cl. ............................. 118/13; 118/19; 99/494; 220/501; 366/130
[58] Field of Search .................... 118/13, 19, 417; 99/494; 126/348, 369, 383, 377, 373; 366/130, 226; 220/4.21, 4.24, 501

[56] References Cited

U.S. PATENT DOCUMENTS

| | | | |
|---|---|---|---|
| 1,910,900 | 5/1933 | Johnson | 366/130 |
| 2,784,949 | 3/1957 | Dennon | 366/130 |
| 4,854,476 | 8/1989 | Serio, Jr. | 220/4.21 |
| 5,358,330 | 10/1994 | Moll | 366/130 |

Primary Examiner—Laura Edwards
Attorney, Agent, or Firm—David L. Ray

[57] ABSTRACT

A method and apparatus for coating food with batter, the apparatus including two hollow generally cylindrical containers open at one end and closed at the other end, and a generally hollow cylindrical coupling member open at both ends, each end being adapted to receive the open end of each of said cylindrical containers, the coupling member having a perforated platform therein which divides the coupling member into two cylindrical sections; the method including placing batter in one of the two containers, placing food in one of the two containers, connecting the coupling member to the container having batter therein, connecting the other container to the coupling member to the coupling member, and shaking the assembled coupling member and two containers to cause batter to coat the food.

14 Claims, 5 Drawing Sheets

APPARATUS FOR APPLYING COATINGS TO FOOD

BACKGROUND OF THE INVENTION

1. Field of the Invention

The invention relates to food products, and, in particular, to coating food before cooking, serving, or storing the food product. More particularly, the present invention relates to a method and apparatus for coating food with flour, corn meal, seasoning, or the like prior to cooking the food product.

2. Description of the Related Art

It is common practice to place food to be coated with a material such as flour or the like in an paper bag and shake the bag until it is assumed proper coating of the food with flour has occurred. The food may be wet, and the moisture from the food may weaken the bag and cause the bag to rupture.

If the bag does not rupture, the food is removed by reaching into the paper bag and removing the coated food therefrom. If sufficient coating of the food with flour has not been achieved, the food must be placed in the bag and shaken again. The food may be dipped in a liquid such as oil or raw eggs prior to being placed in the paper bag to increase the amount of coating retained by the food. Such liquids often weaken the paper bag and may cause the bag to rupture and spill the contents therefrom.

Common coatings for food include flour, corn meal, seasoning such as salt, pepper, and the like, and combinations thereof. Such coatings and mixtures of coatings are hereinafter referred to as "batter". Exemplary of food which may be coated with batter in accordance with the present invention include poultry such as chicken, quail, duck and the like, red meat such as beef, pork, lamb, and the like, and seafood such as fish, shrimp, oysters, and the like.

SUMMARY OF THE INVENTION

In accordance with the present invention there is provided a method and apparatus for coating food with batter. The apparatus of the invention includes two hollow generally cylindrical containers open at one end and closed at the other end, and a generally hollow cylindrical coupling member open at both ends, each end being adapted to receive the open end of each of said cylindrical containers, the coupling member having a perforated platform therein which divides the coupling member into two cylindrical sections.

The method of the invention includes placing batter in one of the two containers, placing food in one of the two containers, connecting the coupling member to the container having batter therein, connecting the other container to the coupling member, and shaking the assembled coupling and two containers to cause batter to coat the food.

The present invention has the advantage of securely sealing all batter and food inside during application of the batter to the food.

Furthermore, the invention enables the user to view the food items during application of batter to determine when the application of batter is complete.

In addition, the invention enables separation of unused batter to a container separate from the container holding the food coated with batter.

The present invention also decreases the time necessary to thoroughly apply batter to food.

Also, the present invention provides a rigid container which will not rupture when wet or oily food is shaken therein.

DESCRIPTION OF THE PREFERRED EMBODIMENTS

Figure 1:
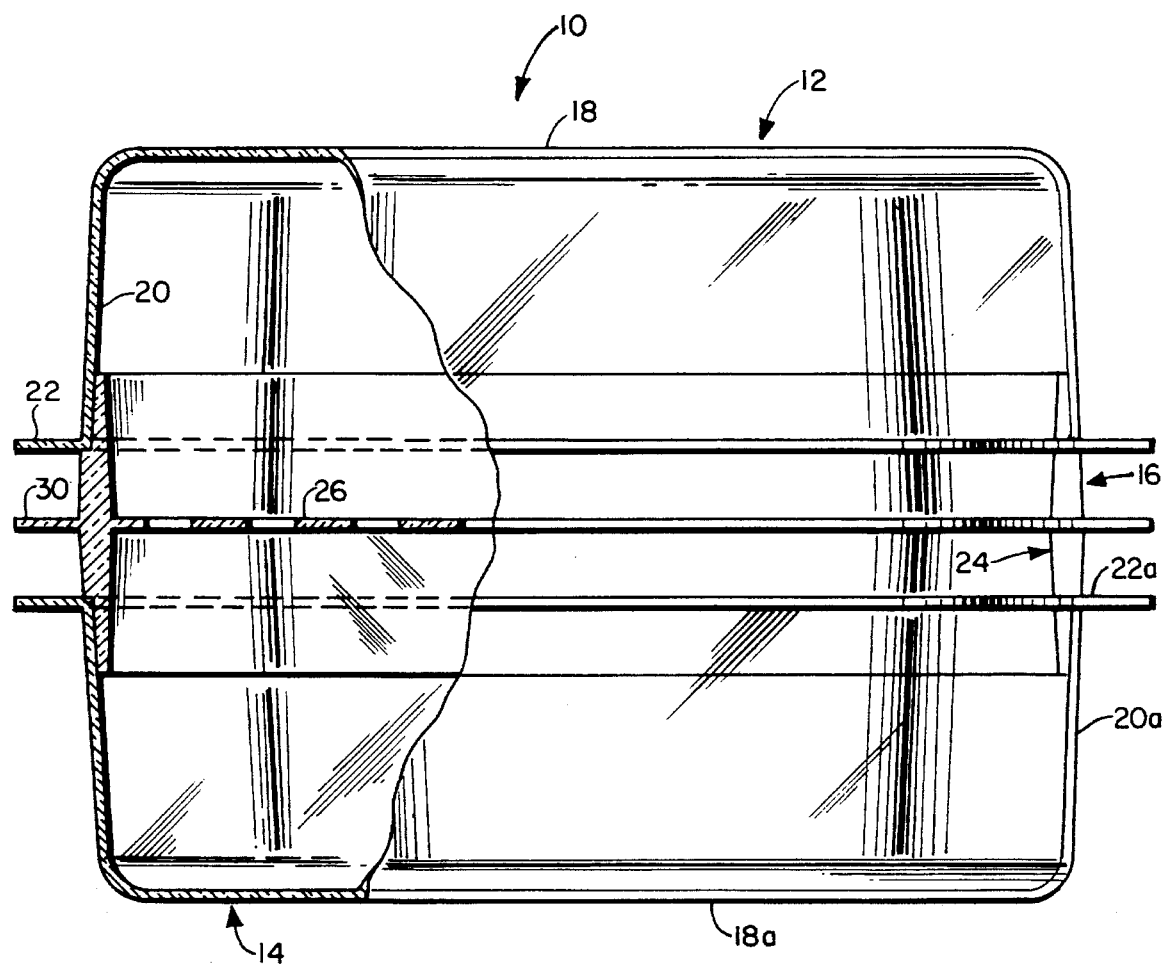
FIG. 1 is an elevational, partly cut-away, partly cross-sectional view of the apparatus of the invention.

Referring now to the drawings, in FIG. 1 is shown the apparatus of the invention generally indicated by the numeral 10. Apparatus 10 includes a first container generally indicated by the numeral 12, a second container generally indicated by the numeral 14, and a coupling member generally indicated by the numeral 16.

Container 12 has a flat bottom 18 from which extends generally cylindrical sidewall 20. Preferably sidewall 20 is about three inches in height.

At the top of side wall 22 of container 12 is a flat, generally circular ledge 22 extending outward from sidewall 20. Preferably, ledge 22 extends completely around the outside of sidewall 20 at the top, open end 21 of sidewall 20. Also, ledge 22 is preferably parallel to bottom 18. Preferably, open end 21 is about 10 inches in diameter, although open end 21 of container 12 may be larger or smaller in diameter if desired.

Figure 5:
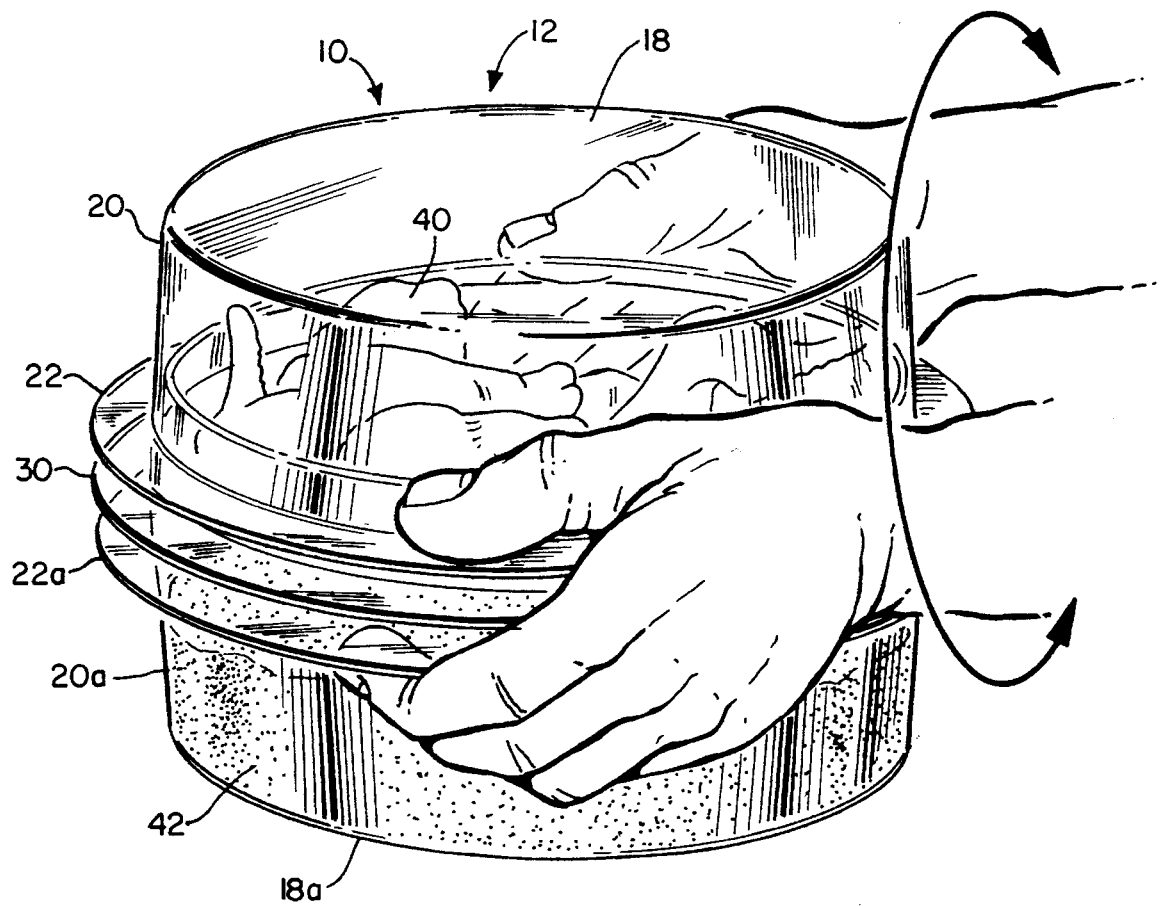
FIG. 5 is a perspective view of the assembled apparatus of the invention having food and batter therein being held by the user.

The size of bottom 18, sidewall 20, and ledge 22 may be selected as desired. Preferably, ledge 22 is large enough to permit grasping by the hands 24 of the user as shown in FIG. 5. A preferred outside diameter of ledge 22 is 11.5 inches.

Preferably, the thickness of bottom 18, sidewall 20, and ledge 22 is identical and uniform throughout container 12. It is preferred that container 12 is formed from a polymeric material such as polyethylene. Other polymeric materials may also be used if desired. Furthermore, it is preferred that container 12 is made from a transparent material so that the contents can be viewed by the user when apparatus 10 is assembled as shown in FIGS. 1 and 5.

Figure 2:
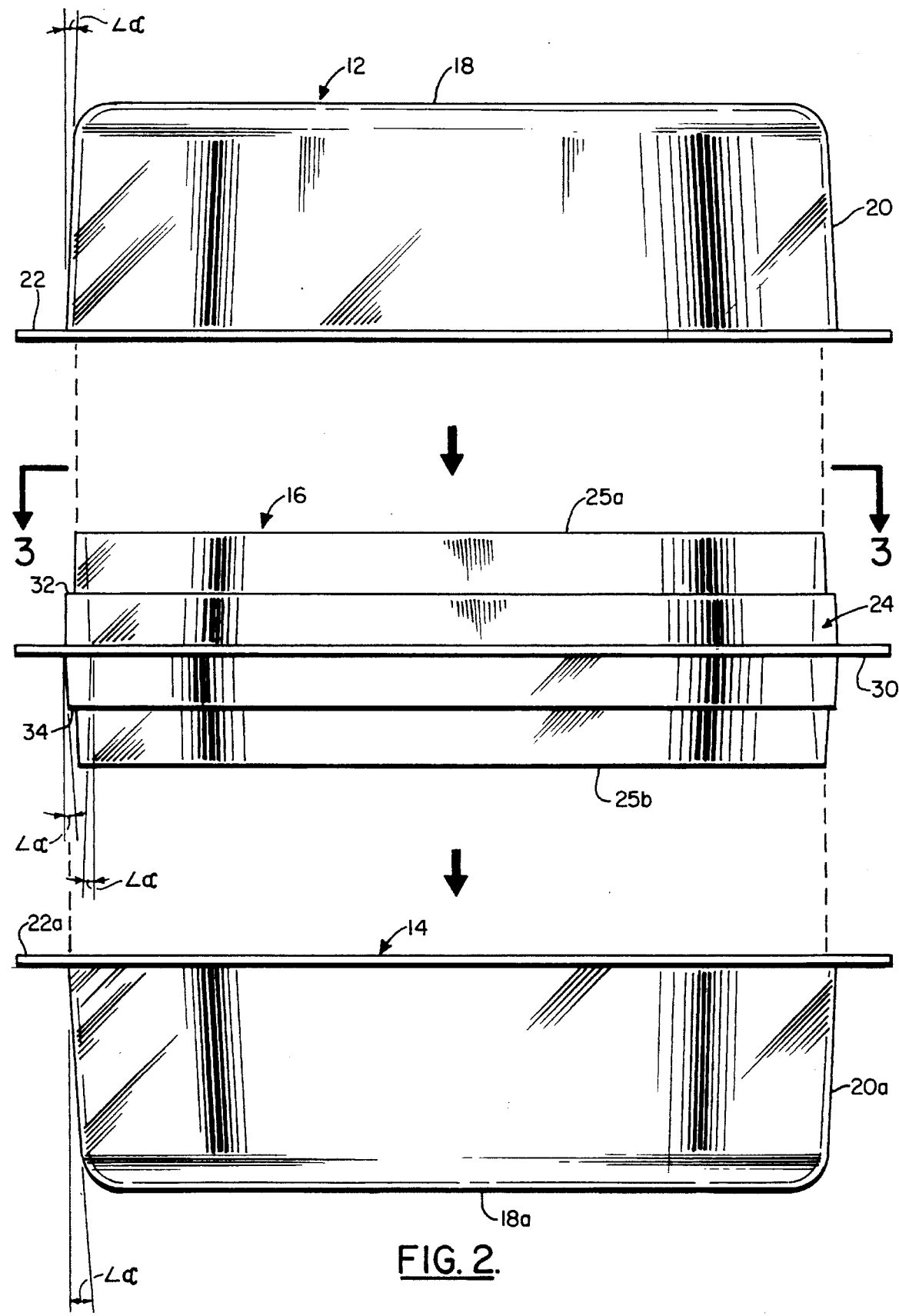
FIG. 2 is an exploded, elevational view of the apparatus of the invention.
Figure 3:
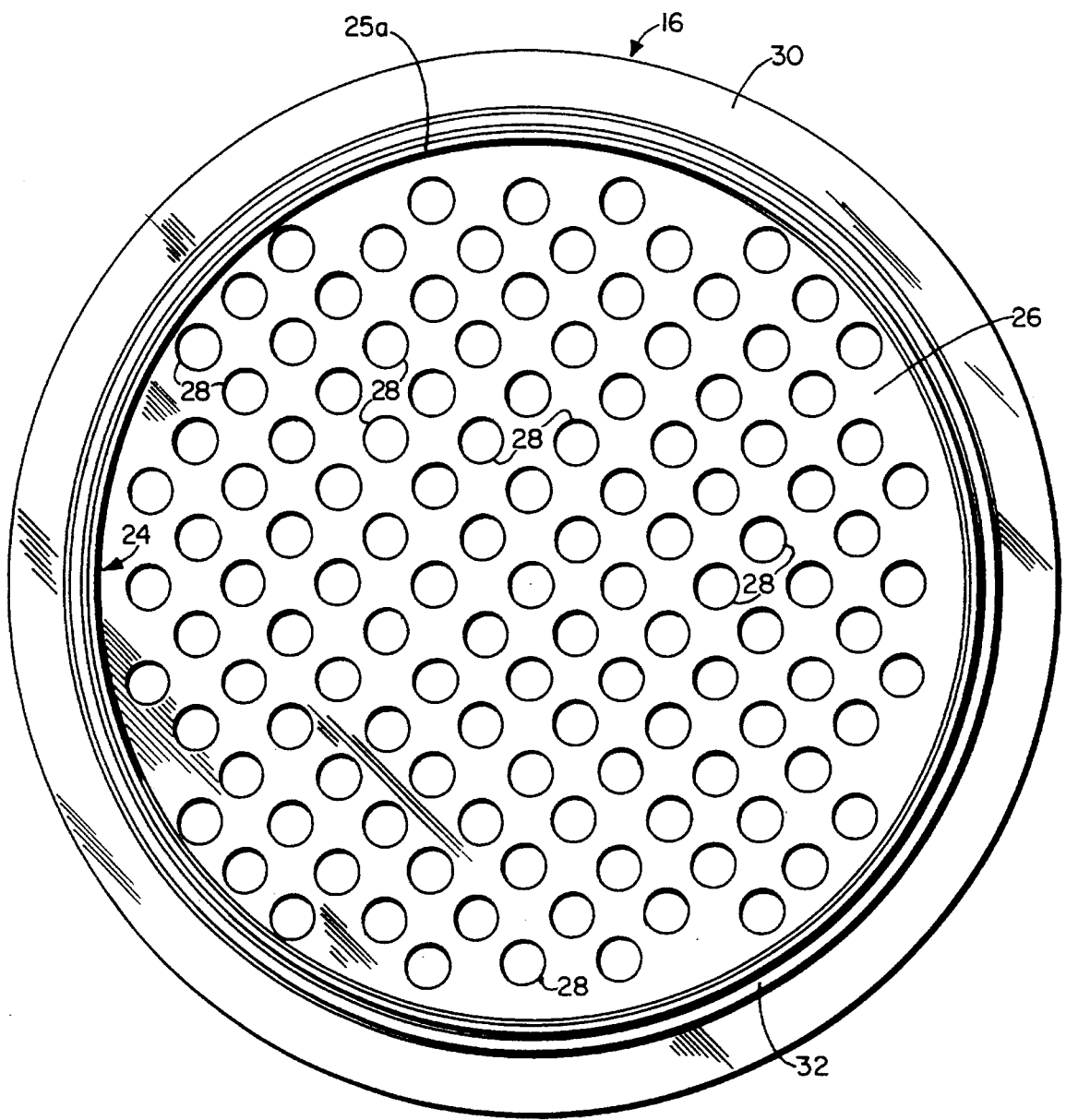
FIG. 3 is a plan view taken along lines 3—3 of FIG. 2.

Sidewall 20 preferably forms an angle $\alpha$ with bottom 18 as indicated in FIG. 2 to enable container 12 to be easily removed from a mold in which container 12 may be formed from a molten polymeric material.

Container 14 is preferably identical to container 12, and has bottom 18a from which extends generally cylindrical sidewall 20a. Preferably sidewall 20a is about three inches in height.

At the top of sidewall 20a of container 14 is a flat, generally circular ledge 22a extending outward from sidewall 20a. Preferably, ledge 22a extends completely around the outside of sidewall 20a at the top, open end 21a of sidewall 20a. Also, ledge 22a is preferably parallel to bottom 18a. Preferably, open end 21a is about 10 inches in diameter, although open end 21 of container 14 may be larger or smaller in diameter if desired.

The size of bottom 18a, sidewall 20a, and ledge 22a may be selected as desired. Preferably, ledge 22a is large enough to permit grasping by the hands 24a of the user as shown in FIG. 5. A preferred outside diameter of ledge 22a is 11.5 inches.

Preferably, the thickness of bottom 18a, sidewall 20a, and ledge 22a is identical and uniform throughout container 14. It is preferred that container 14 is formed from a polymeric material such as polyethylene. Other polymeric materials may also be used if desired. Furthermore, it is preferred that container 14 is made from a transparent material so that the contents can be viewed by the user when apparatus 10 is assembled as shown in FIGS. 1 and 5.

Sidewall 20a preferably forms an angle α with bottom 18a as indicated in FIG. 2 to enable container 14 to be easily removed from a mold in which container 14 may be formed from a molten polymeric material.

Coupling member 16 has a generally cylindrical sidewall generally indicated by the numeral 24 which is open at both ends 25a and 25b. Preferably sidewall 24 is about three inches in height, although the height could be increased or decreased if desired. A platform 26 is centrally located in sidewall 24 and has holes or perforations 28 therein. Platform 26 is preferably has the shape of a disk. Platform 26 divides coupling member 16 into two parts. The size of perforations 28 in platform 26 is selected to prevent passage of food therethrough while enabling passage of batter therethrough from container 12 to container 14, and/or from container 14 to container 12. Preferably, perforations 28 are circular and about one-half inch in diameter.

Aligned with platform 26 and connected to sidewall 24 is ledge 30. Preferably, ledge 30 extends completely around the outside of sidewall 24. Ledge 30 is useful as a handle when connecting coupling member 16 to container 12 and/or 14. Furthermore, ledge 30 is useful when removing container 12 and/or 14 from coupling member 16.

Sidewall 24 has two shoulders 32 and 34 on the outside thereof. Shoulders 32 and 34 limit the movement of containers 12 and 14, respectively, when they are coupled to coupling member 16 as shown in FIG. 1 to prevent containers 12 and/or 14 from being forced too tightly on coupling member 16. Preferably the distance between shoulders 32 and 34 is about 1.5 inches, although the distance between shoulders 32 and 34 may be any desired distance. The outside of sidewall 24 is tapered from ledge 30 to shoulders 32 and 34 by the angle e as indicated in FIG. 2, and the outside of sidewall 24 between shoulders 32 and 34 and the outer edges of sidewall 24 is parallel thereto.

It is preferred that coupling member 16 is formed from a polymeric material such as polyethylene. Other polymeric materials may also be used if desired. Furthermore, it is preferred that coupling member 16 is made from a transparent material so that the contents can be viewed by the user when apparatus 10 is assembled as shown in FIGS. 1 and 5.

The inside of sidewall 24 is tapered from platform 26 to the outer edges of sidewall 24 by the angle e as indicated in FIG. 2.

Angle α may be any desired angle although an angle of about 2° is preferred.

The thickness of the sidewalls, ledges, and bottoms of containers 12 and 14 and coupling member 16 are preferably identical. A preferred thickness is about 0.080 inches, although other desired thicknesses could be utilized if desired.

The dimensions of openings 21 and 21a and the outside diameter of the ends 25a and 25b of sidewall 24 are selected to achieve a snug, slightly force fit between containers 12 and 14 and sidewall 24 when assembled as shown in FIGS. 1 and 5.

Figure 4:
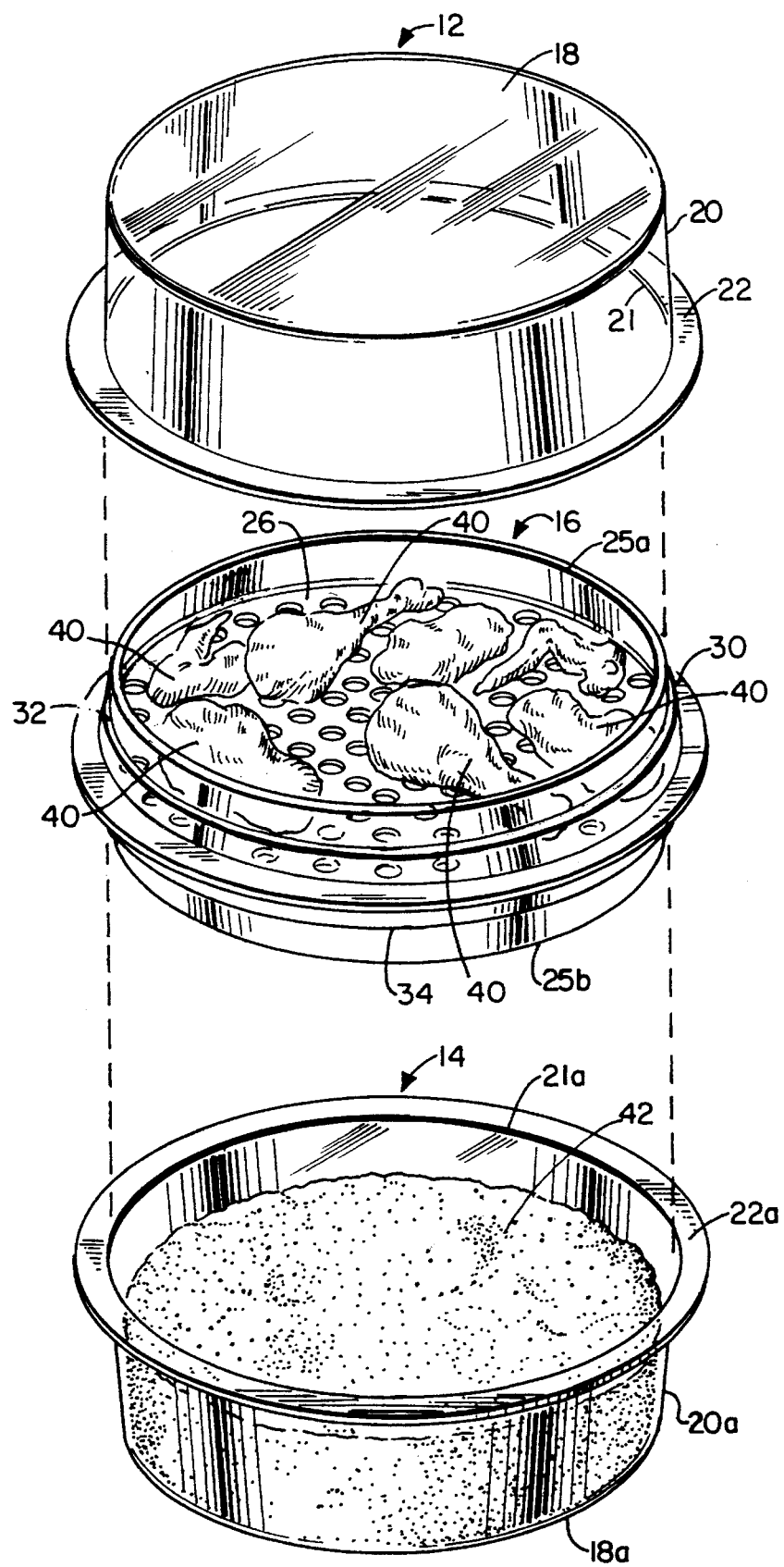
FIG. 4 is an exploded, perspective view of the apparatus of the invention.

In the preferred method of using the present invention to batter food such as chicken parts 40 shown in FIGS. 4 and 5, batter 42 is placed in container 14, and coupling member 16 is then fitted into the open end 21a of container 14 as shown in FIGS. 1 and 5. Food 40 is then placed on the platform 26 in coupling member 16, and container 12 is then fitted onto the coupling member 16 as shown in FIGS. 1 and 5. The assembly of containers 12 and 14 and coupling member 16 is then shaken as indicated by the arrows in FIG. 5.

After food 40 is coated with batter, apparatus 10 is oriented as shown in FIG. 5 and shaken to cause excess batter to fall from container 12 through perforations 28 into container 14. Container 12 is then removed from coupling member 16, and the food removed from coupling member 16. The excess batter is held in container 16, and the procedure may be repeated for additional food to be coated with batter.

In an alternative method of using the present invention to batter food such as chicken parts 40 shown in FIGS. 4 and 5, batter 42 such as flour is placed in container 14, and food is placed in container 14 on the batter. Coupling member 16 is then fitted into the open end 21a of container 14 as shown in FIGS. 1 and 5. Container 12 is then fitted onto the coupling member 16 as shown in FIGS. 1 and 5. The assembly of containers 12 and 14 and coupling member 16 is then shaken as indicated by the arrows in FIG. 5, although the food 4 is in container 14.

After food 40 is coated with batter, apparatus 10 is oriented as shown in FIG. 5 and shaken to cause excess batter to fall from container 12 through perforations 28 into container 14. Container 12 is then removed from coupling member 16, and the food removed from coupling member 16. The excess batter is held in container 16, and the procedure may be repeated for additional food to be coated with batter.

Although the preferred embodiments of the invention have been described in detail above, it should be understood that the invention is in no sense limited thereby, and its scope is to be determined by that of the following claims:

What is claimed is:

1. An apparatus for applying batter to food comprising, in combination:

a first hollow generally cylindrical container open at one end and closed at the other end, said first container having a planar annular ledge on an exterior thereof, said ledge being disposed on said first container adjacent to said open end;

a second hollow generally cylindrical container open at one end and closed at the other end, said second container having a planar annular ledge on an exterior thereof, said ledge being disposed on said second container adjacent to said open end, said second container receiving a batter coating to be applied to said food; and a generally hollow cylindrical coupling member open at both ends, said coupling member including a centered planar annular ledge with tapered shoulders extending from an upper portion and a lower portion of said centered ledge and a perforated platform therein which divides the coupling member into two cylindrical sections, said platform supporting said food, wherein said first and second hollow cylindrical containers slidably engage said shoulders of said coupling member to form a sealed container enabling coating of said food upon shaking said sealed container.

2. The apparatus of claim 1 wherein said first container is identical in size to said second container.

3. The apparatus of claim 1 wherein said ledge on said first container extends completely therearound.

4. The apparatus of claim 1 wherein said ledge on said second container extends completely therearound.

5. The apparatus of claim 1 wherein said ledge on said coupling member extends completely therearound.

6. The apparatus of claim 1 wherein said first container has said ledge on the outside thereof extending completely therearound, said second container has said ledge on the outside thereof extending completely therearound, and said coupling member has said ledge on the outside thereof extending completely therearound.

7. The apparatus of claim 6 wherein said ledge on the outside of said coupling member is horizontally aligned with said perforated platform.

8. The apparatus of claim 6 wherein said ledge on said first container is adjacent to said open end of said first container.

9. The apparatus of claim 1 wherein each of said ledges is of sufficient size to be grasped by the hands of a user to force said ledges toward, or away from, each other.

10. The apparatus of claim 1 wherein said ledge on said second container is adjacent to said open end of said second container.

11. The apparatus of claim 1 wherein said platform on said coupling member is located in the center of said coupling member.

12. The apparatus of claim 11 wherein said platform is perpendicular to the central axis of said generally cylindrical coupling member.

13. The apparatus of claim 11 wherein said platform is disk-shaped.

14. An apparatus for applying batter to food comprising, in combination:

a first hollow generally cylindrical container open at one end and closed at the other end, said first container having a planar annular ledge on an exterior thereof, said ledge being disposed on said first container adjacent to said open end;

a second hollow generally cylindrical container open at one end and closed at the other end, said second container having a planar annular ledge on an exterior thereof, said ledge being disposed on said second container adjacent to said open end, said second container receiving a batter coating to be applied to said food; and a generally hollow cylindrical coupling member open at both ends, said coupling member including a centered planar annular ledge with tapered shoulders extending from an upper portion and a lower portion of said centered ledge and a perforated platform therein which divides the coupling member into two cylindrical sections, said platform supporting said food, wherein said first and second hollow cylindrical containers are slidably forced longitudinally onto said shoulders of said coupling member without rotating said first or second hollow cylindrical containers to form a sealed container enabling coating of said food upon shaking said sealed container.

* * * * *